United States Patent [19]

Noda et al.

[11] Patent Number: 4,482,986
[45] Date of Patent: Nov. 13, 1984

[54] OBJECTIVE LENS MOUNT FOR OPTICAL DISC PLAYER

[75] Inventors: Toyokazu Noda, Tokyo; Hiroshi Ohki, Kawasaki, both of Japan

[73] Assignee: Sony Corporation, Tokyo, Japan

[21] Appl. No.: 341,007

[22] Filed: Jan. 20, 1982

[30] Foreign Application Priority Data

Jan. 30, 1981 [JP] Japan ................................ 56-12563
Jun. 22, 1981 [JP] Japan ............................ 56-91969[U]

[51] Int. Cl.³ .............................................. G11B 7/12
[52] U.S. Cl. ....................................... 369/44; 369/45; 369/112; 350/255
[58] Field of Search .................... 369/45, 44, 111, 112; 350/252, 255; 250/201, 202

[56] References Cited

U.S. PATENT DOCUMENTS

| | | | |
|---|---|---|---|
| 2,905,054 | 9/1959 | Logan | 350/252 |
| 4,110,008 | 8/1978 | Uesugi | 350/255 |
| 4,135,083 | 1/1979 | Alem | 369/45 |
| 4,135,206 | 1/1979 | Kleuters | 369/44 |
| 4,302,830 | 11/1981 | Hamaoka | 369/45 |

FOREIGN PATENT DOCUMENTS

2025110 1/1980 United Kingdom .................. 369/44

*Primary Examiner*—Alan Faber
*Attorney, Agent, or Firm*—Lewis H. Eslinger; Alvin Sinderbrand

[57] ABSTRACT

In an optical disc player or other apparatus in which a light beam is directed through an objective lens to be focused thereby at a record medium surface for optically reading information recorded in a track on such surface, the lens is mounted in one end of a tubular mounting member through which the path of the light beam extends longitudinally, a support member extends about the tubular mounting member, a leaf spring member, preferably of amorphous metal, extends between the other end of the tubular mounting member and the support member to permit longitudinal movements of the mounting member for correcting focusing errors, and further to permit swinging movements of the mounting member about a center located at such other end for correcting tracking and/or time base errors, and a body of substantially bulky elastic material, such as, polyurethane foam, is interposed between the support member and the tubular mounting member at a location along the latter intermediate its ends for further supporting the tubular mounting member in respect to its longitudinal and swinging movements relative to the support member.

15 Claims, 5 Drawing Figures

OBJECTIVE LENS MOUNT FOR OPTICAL DISC PLAYER

BACKGROUND OF THE INVENTION

1. Field of the Invention

This invention relates generally to an apparatus, such as, an optical disc player, in which a light beam is directed against a disc or other record medium surface for optically reading information recorded in a track on such surface, and more particularly is directed to an improved objective lens assembly for such apparatus.

2. Description of the Prior Art

It is known, for example, as disclosed in U.S. Pat. No. 4,135,083, to provide an optical disc player with a focusing servo by which the light beam from a laser light source is correctly focused on the disc surface through an objective lens, and also with a tracking servo by which the point of impingement of the focused light beam on the disc surface is made to coincide with the track being scanned or read. Further, in the above identified U.S. patent, and particularly in FIGS. 7–10 thereof, and also in U.K. Patent Application GB No. 2,025,110A, it is disclosed to support the objective lens by first and second sets of springs which respectively permit the objective lens to be moved, in response to electromagnetically applied forces, both in the axial direction for correcting focusing errors, and in a direction extending radially in respect to the track being scanned for correcting tracking errors. However, the use of a plurality of leaf springs to support the objective lens, as aforesaid, leads to undesirable complexities in assembling the objective lens and its mounting structure, and gives rise to additional problems in that resonance is easily generated and, when the leaf springs are formed of metal, the value of Q becomes high and noises are likely to be produced during servo operation.

OBJECTS AND SUMMARY OF THE INVENTION

Accordingly, it is an object of the present invention to provide an apparatus in which a light beam is directed against a record medium surface for optically reading information recorded in a track on such surface, which apparatus is free of the previously mentioned disadvantages of the prior art.

More specifically, it is an object of this invention to provide an apparatus, as aforesaid, with an improved objective lens assembly which can be desirably employed for correcting focusing errors and further for correcting tracking and/or time base errors.

Another object is to provide an improved objective lens assembly for an optical disc player, as aforesaid, and which is relatively simple in construction and reliable in operation.

A further object is to provide an improved objective lens assembly, as aforesaid, which is easily assembled, and which avoids any permanent variation in the neutral position of its objective lens due to either rough handling during assembly or extreme conditions during operation.

In accordance with an aspect of this invention, in an apparatus, such as, an optical disc player, in which a light beam is directed against a record medium surface for optically reading information recorded in a track on such surface, an objective lens interposed in the path of the light beam for focusing the latter substantially at the record medium surface is mounted at one end of a tubular mounting member through which the path of the light beam extends longitudinally, a support member extends about the tubular mounting member, metallic leaf spring means extends between the support member and the other end of the tubular mounting member, that is, the end remote from the objective lens, for permitting longitudinal movements of the mounting member in the direction of the optical axis of the objective lens and further for permitting swinging movements of the mounting member about a center in said other end thereof, and a body of substantially bulky elastic material, such as, polyurethane foam, is interposed between the support member and the tubular mounting member at a location intermediate the ends of the latter for further supporting the mounting member in respect to its longitudinal and swinging movements relative to the support member.

In a preferred embodiment of the invention, the above mentioned leaf spring means is formed of amorphous metal and desirably consists of inner and outer circular portions secured to the mounting member and the support member, respectively, and a plurality of equally spaced, substantially spiral connecting portions extending integrally between the inner and outer circular portions.

The above, and other objects, features and advantages of the invention, will be apparent in the following detailed description of illustrative embodiments thereof which is to be read in connection with the accompanying drawings in which like parts are identified by the same reference numerals in the several views.

DESCRIPTION OF PREFERRED EMBODIMENTS

Figure 1:
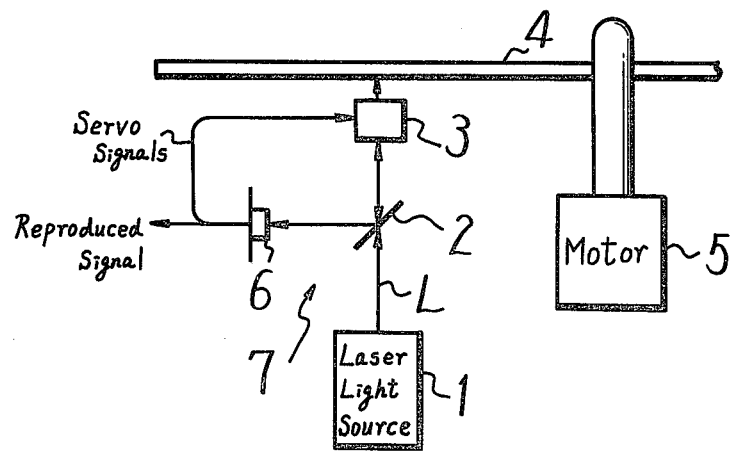
FIG. 1 is a diagrammatic view showing the essential components of an optical disc player in which an objective lens assembly according to an embodiment of this invention may be employed.

Referring initially to FIG. 1, it will be seen that, in an apparatus of the type to which this invention may be advantageously applied, a laser light source 1 generates a light beam L which passes through a beam splitter or semi-reflecting mirror 2 so as to travel through an objective lens assembly 3 in a path which is normal to the surface of an optical record disc 4. The objective lens assembly 3 is provided for focusing the light beam substantially at the surface of disc 4 as the latter is rotated about its center by means of a motor 5. The focused light beam, upon being reflected from the surface of disc 4, is returned through objective lens assembly 3 and now is reflected by beam splitter 2 so as to impinge on a photosensitive detector or transducer device 6. The reflected light beam is modulated by an information signal recorded in a substantially circular track on the surface of disc 4 and which is scanned by the focused light beam as disc 4 is rotated so that an output of transducer device 6 is similarly modulated to reproduce or play back the recorded signal. As is conventional, the record track being scanned on disc 4 may be one turn of a continuous spiral, and laser 1, beam splitter 2, objective lens assembly 3 transducer device 6 may all be included in a head or reading unit 7 which is movable radially in respect to the axis of rotation of disc 4 in synchronism with the rotation of the latter by motor 5 so that the focused light beam will approximately track or follow the spiral record track. Further, as is conventional, the light beam reflected from disc 4 may be made to contain information relative to the focusing of the light beam in respect to the surface of disc 4 and also information concerning tracking of the record track by the light beam, and such focusing and tracking informations are detected by parts of transducer device 6 and employed in a known manner to provide focusing and tracking servo or error signals to objective lens assembly 3. As hereinafter described in detail, such focusing and tracking servo or error signals are respectively effective, in objective lens assembly 3, to move an objective lens thereof substantially vertically toward and away from disc 4 for correcting focusing errors and radially in respect to the axis of rotation of disc 4, that is, substantially transversely in respect to the track being scanned, for correcting tracking errors.

Figure 2:
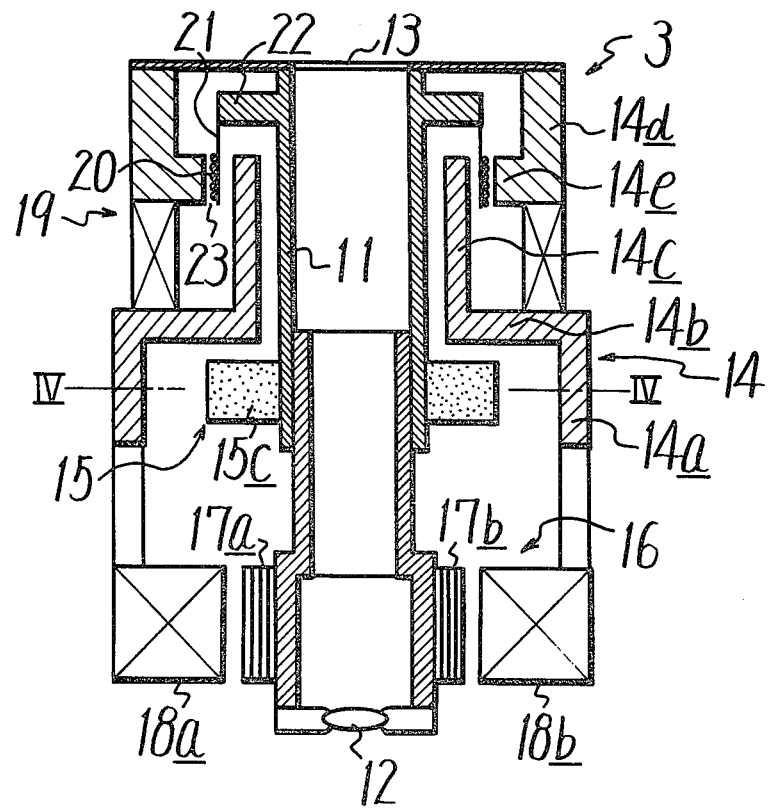
FIG. 2 is a vertical sectional view of an objective lens assembly according to an embodiment of this invention.

Referring now to FIG. 2 it will be seen that the objective lens assembly 3 in accordance with an embodiment of this invention includes a tubular lens mounting member 11 through which the path of light beam L extends longitudinally. An objective lens 12 is suitably mounted at one end of tubular mounting member 11, for example, at the lower end of the latter as viewed on FIG. 2, with the optical axis of such lens 12 coinciding substantially with the path of the light beam therethrough. The other or upper end of tubular mounting member 11 is suspended by way of a leaf spring member 13 from a cylindrical support member 14 which extends about mounting member 11 and forms an outer housing of objective lens assembly 3.

Figure 3:
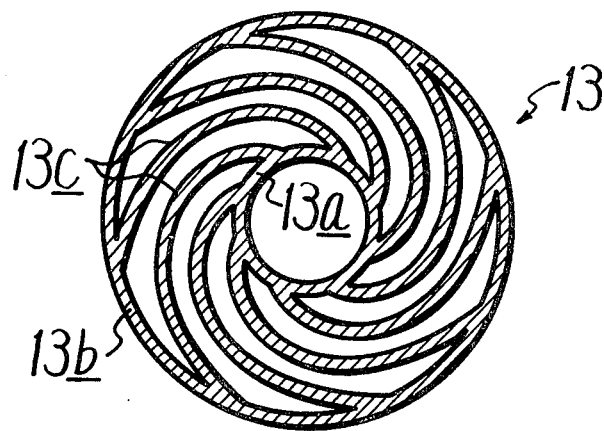
FIG. 3 is a top plan view of a leaf spring member included in the assembly of FIG. 2.

As shown particularly on FIG. 3, a leaf spring member 13 is desirably formed of a metal plate which is punched or stamped out so as to have inner and outer circular portions 13a and 13b suitably secured to the upper end surfaces of mounting member 11 and support member 14, respectively, and a plurality of equally spaced, substantially spiraling connecting portions 13c extending integrally from inner circular portion 13a to outer circular portion 13b. By reason of the described configuration of leaf spring member 13, the connecting portions 13c thereof may be of substantial length for providing the requisite resilient flexibility without requiring a correspondingly large radial distance between tubular mounting member 11 and the outer housing or support member 14. Due to its suspension from outer housing or support member 14 by way of leaf spring member 13, tubular mounting member 11 is free to move to longitudinally or up and down, that is, in the direction of the optical axis of objective lens 12, and tubular mounting member 11 is further free to swing or move angularly about a center located at the upper end of member 11.

Further, in accordance with the present invention, objective lens assembly 3 is provided with a body 15 of elastic material which is interposed between tubular mounting member 11 and support member or outer housing 14 at a location along member 11 spaced from its upper or resiliently mounted end, for example, at a location approximately midway between the ends of mounting member 11, as shown on FIG. 2, for further yieldably supporting tubular mounting member 11 in respect to its longitudinal and swinging movements relative to support member 14. The elastic material of which body 15 is formed is preferably substantially bulky, that is, occupies a relatively large volume for its weight. For example, the elastic body 15 may be desirably formed of a foamed synthetic resin, such as, polyurethane foam. The body 15 is of substantial thickness in the axial direction of tubular mounting member 11 and is adhesively or otherwise bonded to the outer surface of mounting member 11 and to the inner surface of support member or outer housing 14 so as to exert the desired yieldable resistance to the longitudinal and swinging movements of mounting member 11. Further, by suitably selecting the cross-sectional configuration of body 15 in a plane perpendicular to the longitudinal axis of tubular mounting member 11, body 15 may provide relatively large yieldable resistance to swinging movements of mounting member 11 in certain predetermined directions, and relatively small yieldable resistance to swinging movements in other directions.

Figure 4A:
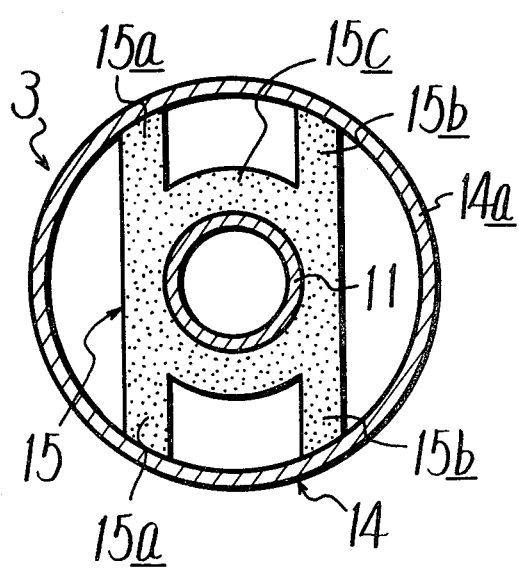
FIG. 4A is a sectional view taken along the line IV—IV on FIG. 2.

Thus, for example, as shown in FIG. 4A, elastic body 15 may be generally of H-shaped cross-section to present substantially parallel legs 15a and 15b extending from a central portion 15c embracing mounting member 11 to the inner surface of support member 14. Such H-shaped cross-sectional configuration is imparted to elastic body 15 in the case where the swinging movements of tubular lens mounting member 11, and the corresponding lateral movements of objective lens 12 are to be employed for correcting tracking errors, that is, for displacing the point of impingement of light beam L on the surface of record disc 4 in the radial direction in respect to the center of disc 4, which corresponds to displacements in the transverse direction in respect to the substantially circular track being scanned. In such case, elastic body 15 is positioned so that its parallel legs 15a and 15b extend substantially in the direction along the track being scanned, that is, legs 15a and 15b are disposed in planes that are substantially parallel to a tangent to the track at the point of impingement of the light beam thereon. By reason of the foregoing arrangement of H-shaped elastic body 15, parallel legs 15a and 15b relatively strongly resist swinging movements of tubular mounting member 11 and corresponding displacements of objective lens 12 in the direction along the track being scanned, while only relatively light yieldable resistance is offered to swinging movements of mounting member 11 and the corresponding displacements of lens 12 in the transverse direction relative to the tracking being scanned.

Referring again to FIG. 2, it will be seen that a first electro-magnetic device 16 is provided adjacent the lower end of tubular mounting member 11 and is operative to effect the desired swinging movements of such member 11. More particularly, such first electro-magnetic device 16 is shown to include a pair of coils 17a and 17b mounted on tubular mounting member 11 at diametrically opposed locations adjacent the lower end thereof, and magnets 18a and 18b mounted at the lower end of support member 14 in confronting relation to diametrically opposed coils 17a and 17b, respectively. Thus, swinging movements of tubular mounting member 11 for correcting any tracking errors are effected in response to the supplying of suitable driving currents or tracking errors signals to the diametrically opposed coils 17a and 17b.

The objective lens assembly 3 according to the invention is further shown to comprise a second electromagnetic device 19 disposed adjacent the upper or suspended end of tubular mounting member 11 and being operative to effect the longitudinal movements of mounting member 11 relative to support member or outer housing 14. In the illustrated embodiment of the invention, the second electro-magnetic device 19 is shown to include a coil 20 wound on a cylindrical bobbin 21 which is coaxial with tubular mounting member 11 and depends from a radially outward directed flange 42 at the upper end portion of mounting member 11. Further, electro-magnetic device 19 is shown to include an annular magnet 22 for generating a magnetic field intersected by coil 20 so that the supplying of a driving current or focusing error signal to coil 20 is effective to cause longitudinal movements of mounting member 11 relative to outer housing or support member 14. Preferably, as shown, support member 14 include a lower or first portion 14a extending axially from adjacent the lower end of mounting member 11 to a radially inwardly directed flange 14b above elastic body 15 and terminating in a reduced diameter section 14c which extends axially between tubular mounting member 11 and bobbin 21 to adjacent the upper end portion of mounting member 11. The support member or outer housing 14 further includes a relatively short cylindrical second or upper portion 14d having in inturned lower edge portion 14e, and the annular magnet 22 of electromagnetic device 19 is suitably secured axially between portions 14a and 14d of outer housing 14. In the embodiment of the invention being described, outer housing or support member 14 is formed of magnetic material and its portions 14a and 14d are relatively dimensioned so that an annular gap 23 is defined between reduced diameter section 14c of lower portion 14a and inturned edge 14e of upper portion 14d for receiving bobbin 21 with coil 20 thereon. With magnet 22 being polarized to provide opposite poles at its top and bottom surfaces, it will be apparent that flange 14b and section 14c of housing portion 14a and the upper housing portion 14d act as a yoke to provide a concentrated magnetic field across gap 23 for cooperation with coil 20. Thus, mounting member 11 and objective lens 12 thereon, are sensitively longitudinally displaced in response to the application of a focusing error signal to coil 20.

Since lens mounting member 11 is suspended from support member 14 only by a single leaf spring member 13 and by the body 15 of substantially bulky elastic material, there is no danger that a secondary resonance will be generated. If leaf spring member 13 is formed of phosphor bronze, beryllium bronze, stainless steel or the like, its mechanical strength can be made sufficient for the normal operation of objective lens assembly 3, in which case there is no danger that, with time, variations will appear in the verticality of mounting member 11 or in its center or neutral position considered in the vertical direction. Further, if a foamed synthetic resin, such as, polyurethane foam, is used for elastic body 15, the value of Q can be desirably lowered while the generation of noise and any plastic deformation of leaf spring member 13 are avoided under conditions of normal operation. However, if an abnormal phenomenon occurs in the operation of the optical disc player and, as a result thereof, objective lens mounting member 11 is made to swing or move longitudinally beyond its normal ranges for such movements, the resulting forces applied to leaf spring member 13 may exceed the yielding stresses thereof with the result that leaf spring member 13 is subjected to plastic deformation. Similarly, plastic deformation of leaf spring member 13 may occur when objective lens assembly 3 is being handled either during the assembly thereof or during its maintenance. If leaf spring member 13 is subjected to plastic deformation, the optical axis of objective lens 12 may be inclined with the result that the focusing effect of the lens is deteriorated, or the servo action for correcting focusing and/or tracking errors may become unstable. If such extreme caution is exercised during the manufacturing of objective lens assembly 3 so as to avoid any excessive stressing of leaf spring member 13 that might result in its plastic deformation, then the manufacturing or assembling operations become disadvantageously slow and inefficient. Moreover, if the thickness of leaf spring member 13 is reduced so as to increase the sensitivity of mounting member 11, in its longitudinal and swinging movements, to the focusing and tracking error signals applied to coil 20 and to coils 17a and 17b, respectively, then the susceptibility of leaf spring member 13 to being plastically deformed in response to excessive stressing is increased and the warping or deflection of leaf spring member 13 in the absence of any signals applied to the coils 17a, 17b and 20 may become undesirably large.

In order to avoid the foregoing problems, in objective lens assembly 3 according to this invention, leaf spring member 13 is preferably formed of amorphous metal, such as, $Fe_8Co_{72}Si_{10}B_{10}$ or $Fe_{60}Cr_{20}P_{13}C_7$, and provided with a thickness of about 40μ. Such amorphous metal has a high strength or toughness, and provides a yielding strength of 200 to 300 kg/mm$^2$ with a Young's modulus of 10$^4$ kg/mm$^2$, so that, even if an abnormal phenomenon occurs during the operation of the optical disc player which causes excessive swinging or longitudinal movements of mounting cylinder 11, leaf spring member 13 is not subject to plastic deformation. Therefore, the neutral position of objective lens 12 is maintained constant, both in terms of the perpendicularity of its optical axis in respect to the surface of disc 4 and in respect to the focal position of lens 12.

Further, when leaf spring member 13 is formed of $Fe_8Co_{72}Si_{10}B_{10}$ which is also magnetic, leaf spring member 13 can function as a shield for magnetic flux, whereby to avoid any magnetic influence of objective lens assembly 3 on any adjacent magnetic circuit.

Of course, in the objective lens assembly 3 according to this invention, when tubular mounting member 11 is tilted or subjected to swinging movements for correcting tracking errors, objective lens 12 is correspondingly tilted. However, such tilting of objective lens 12 is small enough to pose no significant problem. For example, if it is assumed that tubular mounting member 11 has a length of 30 mm, and that the tracking servo operation requires a maximum lateral displacement of objective lens 12 of as much as ±100 μm, then the corresponding tilting angle α of tubular mounting member 11 is as follows:

$$\alpha = \tan^{-1} \times \frac{0.1}{30} = 0.19°$$

Aberrations resulting from the passage of the light beam through objective lens 12 at such a small angle α to the optical axis can be substantially removed by conventional means, and therefore, pose no problem.

Further, in the case of the H-shaped elastic body 15 shown in FIG. 4A, the sensitivity of the tracking servo is sufficiently high, particularly if such elastic body 15 is formed of polyurethane foam. For example, in such case, if each of coils 17a and 17b, has 100 turns, and if each of legs 15a and 15b of body 15 has a length of 4 mm, measured from the central portion 15c to the inner surface of outer housing 14, and a thickness of 3 mm and a width of 3 mm, the ratio of the lateral displacement of lens 12 to the driving current supplied to coils 17a and 17b will be on the order of several 10 μm/mA.

Figure 4B:
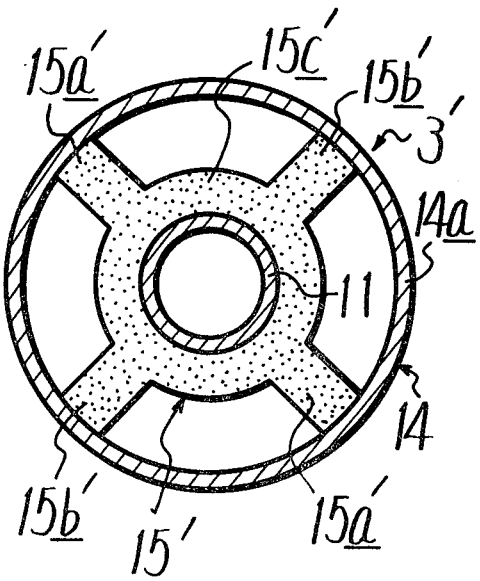
FIG. 4B is a sectional view similar to that of FIG. 4A, but showing another embodiment of the invention.

The above described objective lens assembly 3 is particularly suited for correcting focusing and tracking errors in an optical disc player. However, an objective lens assembly according to this invention may also be provided for correcting time base errors in the reproduced information signal. For example, as shown on FIG. 4B, in an optical lens assembly 3' according to another embodiment of this invention, and which is otherwise similar to the previously described objective lens assembly 3, the elastic body 15' is generally X-shaped in cross-section to present lens 15'a and 15'b which are angularly spaced from each other by approximately right angles. The legs 15'a and 15'b extend radially outward from a central portion 15'c which embraces tubular mounting member 11, and the outer ends of legs 15'a and 15'b and adhered or otherwise bonded to the inner surface of outer housing 14. Furthermore, legs 15'a and 15'b are angularly disposed so that the right angles therebetween will be substantially bisected by the diametrical disposition of the coils 17a and 17b shown on FIG. 2 on the lower end of tubular mounting member 11 for effecting the tracking servo action. Moreover, in the case of the objective lens assembly 3', additional coils (not shown) similar to the coils 17a and 17b are provided on the lower end portion of mounting member 11 but at locations that are right angularly related to coils 17a and 17b, and additional magnets (not shown) similar to the magnets 18a and 18b appearing on FIG. 2 are mounted at the lower end of outer housing 14 so as to confront the previously mentioned additional coils on mounting member 11. With the foregoing arrangement, supplying of a driving current or time base error signal to the mentioned additional coils on mounting member 11 is effective to cause swinging movements of mounting member 11 in the direction along a track being scanned on disc 4, thereby to correct a detected time base error in the reproduced information signal. Of course, in the case of the objective lens assembly 3' according to this invention, servo signals may be applied to the coils 17a and 17b and to the coil 20 for correcting tracking errors and focusing errors, respectively, in the same way as in the first described embodiment of the invention.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A playback apparatus that directs a light beam against a record medium surface for optically reading information recorded in a track on such surface comprising; an objective lens assembly including lens means interposed in the path of said light beam for focusing the latter substantially at said record medium surface, a tubular lens mounting member through which said path extends longitudinally and having said lens means mounted at one end of said mounting member with an optical axis of said lens means coinciding substantially with said path of the light beam therethrough, a support member extending about said mounting member, metallic leaf spring means extending between the other end of said tubular mounting member and said support member for longitudinal movements of said mounting member in the direction of said optical axis and for swinging movements of said mounting member about a center in said other end, and a substantially bulky elastic body of foamed synthetic resin interposed between said support member and said tubular mounting member at a location along the latter spaced from said other end for further supporting said mounting member in respect to said longitudinal and swinging movements relative to said support member.

2. An apparatus according to claim 1; in which said foamed synthetic resin is polyurethane foam.

3. An apparatus according to claim 1; in which said leaf spring means is of amorphous metal.

4. An apparatus according to claim 1; in which said leaf spring means includes inner and outer circular portions secured to said mounting member and said support member, respectively, and a plurality of equally spaced, substantially spiral connecting portions extending integrally between said inner and outer circular portions.

5. An apparatus according to claim 1; in which said substantially bulky elastic material extends between said mounting and support members generally in a direction which corresponds to a direction along said track on the record medium surface so that said tubular mounting member is relatively free to swing in directions normal to said direction along the track for correcting tracking errors.

6. An apparatus according to claim 5; in which said substantially bulky elastic material is generally of H-shaped cross-section to present parallel legs extending in said direction along the track.

7. An apparatus according to claim 1; in which said substantially bulky elastic material is generally X-shaped in cross-section to present right-angled legs which extend between said mounting and support members in directions angularly spaced from directions along the track and transverse thereto, respectively, so that said tubular mounting member is relatively free to swing in said directions along the track and transverse thereto for correcting time base errors and tracking errors, respectively.

8. An apparatus according to claim 1; further comprising first electro-magnetic means cooperatively provided on said mounting and support members adjacent said one end of the mounting member and being operative to effect said swinging movements of the mounting member, and second electro-magnetic means cooperatively provided on said mounting and support members adjacent said other end of the mounting member and being operative to effect said longitudinal movements of the mounting member relative to said support member.

9. An apparatus according to claim 8; in which said support member is cylindrical and has a first portion extending axially from adjacent said one end of the mounting member and terminating in a reduced diameter section extending adjacent said other end of the mounting member, and a second portion adjacent said other end of the mounting member and spaced radially outward from said reduced diameter section to define a gap therebetween; and said second electro-magnetic means includes an annular magnet interposed between said first and second portions of the support member for generating a magnetic field across said gap, a cylindrical bobbin mounted on said other end of the mounting member and extending axially into said gap, and coil means wound on said bobbin to intersect said magnetic field so that said longitudinal movements of said mounting member are effected in response to supplying of a driving current to said coil means.

10. An apparatus according to claim 9; in which said first electro-magnetic means includes at least one pair of diametrically opposed coils on said mounting member adjacent said one end of the latter, and magnets on said first portion of the support member in confronting relation to said diametrically opposed coils so that said swinging movements of the mounting member are effected in response to supplying of a driving current to said diametrically opposed coils.

11. An apparatus according to claim 10; in which said body is located approximately midway along said tubular mounting member between said one and other ends thereof.

12. An apparatus according to claim 11; in which said foamed synthetic resin is polyurethane foam.

13. An apparatus according to claim 12; in which said substantially bulky elastic material is generally of H-shaped cross-section to present parallel legs extending approximately normal in respect to the diametrical disposition on said one pair of coils.

14. An apparatus according to claim 12; in which said substantially bulky elastic material is generally X-shaped in cross-section to present legs which extend between said mounting and support members and which are angularly spaced from each other by approximately right angles substantially bisected by the diametrical disposition of said coils.

15. An apparatus according to claim 8; in which the record medium is in the form of a disc which is rotated about the center thereof, said track is substantially circular and concentric with said disc, said optical axis of the lens means is substantially normal to said record medium surface so that said longitudinal movements of the lens mounting member vary the focus of said lens means at said surface, and said swinging movements of the lens mounting member have components substantially in a plane radiating from said center of the disc so as to be effective to vary the point of the impingement of said light beam on said surface in the direction transverse to said track.

* * * * *